United States Patent [19]

Gerber et al.

[11] Patent Number: 5,594,040

[45] Date of Patent: Jan. 14, 1997

[54] PROCESS FOR PREPARING FLEXIBLE FOAMS

[75] Inventors: Dirk Gerber, Grimbergen; Johan R. Derluyn, Rotselaar; Eric Huygens, Heverlee, all of Belgium

[73] Assignee: Imperial Chemical Industries PLC, London, England

[21] Appl. No.: 591,073

[22] Filed: Jan. 25, 1996

Related U.S. Application Data

[62] Division of Ser. No. 464,493, Jun. 5, 1995, Pat. No. 5,521,225.

[30] Foreign Application Priority Data

Jun. 16, 1994 [GB] United Kingdom ............... 9412105
Dec. 30, 1994 [EP] European Pat. Off. ............ 94203786

[51] Int. Cl.⁶ .................................................. C08G 18/32
[52] U.S. Cl. ........................... 521/159; 521/160; 521/174
[58] Field of Search ............................... 521/159, 160, 521/174

[56] References Cited

U.S. PATENT DOCUMENTS

| | | | |
|---|---|---|---|
| 4,478,960 | 10/1984 | Buethe et al. | 521/160 |
| 4,833,176 | 5/1989 | Wolf et al. | 521/160 |
| 4,945,117 | 7/1990 | Gansen et al. | 521/99 |
| 5,369,138 | 11/1994 | Gansen | 521/159 |

FOREIGN PATENT DOCUMENTS

| | | |
|---|---|---|
| 0010850 | 5/1980 | European Pat. Off. . |
| 0022617 | 1/1981 | European Pat. Off. . |
| 0392788 | 10/1990 | European Pat. Off. . |
| 0398304 | 11/1990 | European Pat. Off. . |
| 0420273 | 4/1991 | European Pat. Off. . |
| 0422811 | 4/1991 | European Pat. Off. . |
| 0442631 | 8/1991 | European Pat. Off. . |
| 0451826 | 10/1991 | European Pat. Off. . |
| 62172011 | 9/1981 | Japan . |
| 03200289 | 7/1987 | Japan . |
| 93/08224 | 4/1993 | WIPO . |

*Primary Examiner*—Morton Foelak

[57] ABSTRACT

Process for making a flexible foam by reacting a polyisocyanate composition having an NCO value of 10–25% by weight and 30–150 parts by weight, per 100 parts by weight of polyisocyanate composition, of a polyol composition comprising water at an isocyanate-index of 40–100.

6 Claims, No Drawings

PROCESS FOR PREPARING FLEXIBLE FOAMS

CROSS REFERENCE TO RELATED APPLICATIONS

The present application is a divisional of U.S. patent application Ser. No. 08/464,493 filed Jun. 5, 1995, now U.S. Pat. No. 5,521,225 entitled "Process for Preparing Flexible Foams".

The present invention is concerned with the preparation of flexible polyurethane foams. Such preparation has been disclosed extensively; see e.g. EP-22617, EP-10850, EP-296449, EP-392788, EP-111121, EP-344551 and EP-555721.

EP-392788 discloses the preparation of flexible foams from MDI-based prepolymers having a rather low NCO value and from an isocyanate-reactive composition comprising relatively high amounts of water.

EP-111121 describes the preparation of flexible polyurethane foam from 1) a prepolymer based on diphenylmethane diisocyanate (MDI) and optionally polymeric MDI and a polyol having 5–30% of oxyethylene groups, the prepolymer having an NCO content of 12–30% by weight, 2) polymeric MDI if the above prepolymer is made from MDI, 3) a polyol, having a low EO content, and 4) a blowing agent.

EP-344551 discloses a process for preparing a flexible foam from a prepolymer having an NCO value of 15–30% by weight which is made from a polyol having a hydroxyl functionality of at least 4.

EP-555721 discloses the preparation of flexible foams from a polyisocyanate prepolymer, water and a mixture of a polyol having a low oxyethylene content and a polyol having a high oxyethylene content.

Surprisingly it has now been found that the properties of foams and their preparation may further be improved. The foams according to the invention show a very high resilience, a very low compression set and a very low hysteresis and are stable (reduced shrinkage); the process for making the foams is characterised by good processing.

Therefore the present invention is concerned with a process for preparing a flexible foam by reacting 1. a polyisocyanate composition, having an NCO value of 10–25% by weight and comprising
   a) 70–90 parts by weight of an isocyanate prepolymer having an NCO value of 5–15% by weight prepared by reacting an excessive amount of an organic polyisocyanate and a polyol having an average nominal hydroxyl functionality of 2–3, a number average equivalent weight of 1000–3000 and an oxyethylene content of 5–25% by weight, preferably the oxyethylene units being at the end of the polymer chain;
   b) 10–30 parts by weight of a polyisocyanate having an NCO value of 30–33% by weight; and
2. a polyol composition in an amount of 30–150, preferably 30–100, parts by weight per 100 parts by weight of the above polyisocyanate composition, said polyol composition comprising
   a) 70–90, preferably 70–85 parts by weight of a polyoxyethylene-polyoxypropylene polyol having an average nominal hydroxyl functionality of 2–3, a number average equivalent weight of 1000–3000, preferably 1000–2000, and an oxyethylene content of 5–25% by weight, preferably the oxyethylene units being at the end of the polymer chain;
   b) 5–25, preferably 10–25, parts by weight of a polyether polyol having an average nominal hydroxyl functionality of 2–8, a number average molecular weight of 200–3000 and an oxyethylene content of at least 80, preferably of 100, % by weight based on the total oxyalkylene content;
   c) 2–8 parts by weight of water; the amount of 2a), 2 b) and 2 c) together being 100 parts by weight; and optionally
   d) additives; at an isocyanate-index of 40–100.

Further the present invention is concerned with a process for preparing a flexible foam by reacting a polyisocyanate composition, having an NCO value of 10–25% by weight and comprising based on 100 parts by weight
   a) 8–60, preferably 10–50 parts by weight of free diphenylmethane diisocyanate;
   b) 2–20, preferably 5–15, parts by weight of free polymethylene polyphenylene polyisocyanates having an isocyanate functionality of 3 or more; and
   c) 30–90, preferably 40–80, parts by weight of an adduct of diphenylmethane diisocyanate and a polyol having an average nominal hydroxyl functionality of 2–3, a number average equivalent weight of 1000–3000 and an oxyethylene content of 5–25% by weight, preferably the oxyethylene units being at the end of the polymer chain and a polyol composition in an amount of 30–150, preferably 30–100, parts by weight per 100 parts by weight of the above polyisocyanate composition, said polyol composition comprising
      a) 70–90, preferably 70–85, parts by weight of a polyoxyethylene-polyoxypropylene polyol having an average nominal hydroxyl functionality of 2–3, a number average equivalent weight of 1000–3000, preferably 1000–2000, and an oxyethylene content of 5–25% by weight, preferably the oxyethylene units being at the end of the polymer chain;
      b) 5–25, preferably 10–25, parts by weight of a polyether polyol having an average nominal hydroxyl functionality of 2–8, a number average molecular weight of 200–3000 and an oxyethylene content of at least 80, preferably of 100, % by weight based on the total oxyalkylene content;
      c) 2–8 parts by weight of water; the amount of 2a), 2 b) and 2 c) together being 100 parts by weight; and optionally
      d) additives; at an isocyanate-index of 40–100.

Further the invention is concerned with reaction systems comprising the above ingredients.

Still further the invention is concerned with a flexible polyurethane foam having a resilience of at least 60%, preferably at least 65% (ISO/DIS 8307); a hysteresis loss of at most 20%, preferably at most 15% (ISO 3386/1); a compression set (50%) core/dry and humid of at most 5% (ISO 1856) and a compression hardness, 40% of 1–5 kPa, preferably 2.5–5 kPa (ISO 3386/1).

For preparing the foams ingredients 1a and 1b may be premixed or brought into contact with the isocyanate-reactive ingredients independently. Likewise ingredients 2a–d may be premixed or not. Preferably the ingredients 1a and 1b are premixed, as well as ingredients 2a–d.

The process is suitable to make moulded flexible foams as well as slabstock flexible foams and preferably is conducted at an isocyanate-index of 70–90.

In the context of the present invention the following terms have the following meaning:
1) isocyanate index or NCO index or index:

the ratio of NCO-groups over isocyanate-reactive hydrogen atoms present in a formulation, given as a percentage:

$$\frac{[NCO] \times 100}{[\text{active hydrogen}]} \quad (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water, if used) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanate components are kept in a container separate from the isocyanate-reactive components.

4) The expression "polyurethane foam" as used herein generally refers to cellular products as obtained by reacting polyisocyanates with isocyanate-reactive hydrogen containing compounds with water as reactive foaming agent (involving a reaction of water with isocyanate groups yielding urea linkages and carbon dioxide and producing polyurea-urethane foams).

5) The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparation although in practice it will often be somewhat less because of some terminal unsaturation.

Ingredient 1a and its preparation has been described in EP-392788.

Organic polyisocyanates for making ingredient 1a) may be selected from aliphatic, cycloaliphatic and araliphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and most preferably polymethylene polyphenylene polyisocyanates having an isocyanate functionality of 2 or more.

The polymethylene polyphenylene polyisocyanates may be selected from diphenylmethane diisocyanate, which includes 4,4'-MDI and isomeric mixtures of 4,4'-MDI, 2,4'-MDI and less than 10% by weight of 2,2'-MDI, crude MDI, polymeric MDI and modified variants of these polymethylene polyphenylene polyisocyanates containing carbodiimide, uretonimine, isocyanurate, urethane, allophanate, urea or biuret groups. Preferred polymethylene polyphenylene polyisocyanates are pure 4,4'-MDI, isomeric mixtures with 2,4'-MDI, uretonimine and/or carbodiimide modified MDI having an NCO content of at least 25% by weight and urethane modified MDI (obtained by reacting excess MDI and a low molecular weight polyol, MW at most 999 preferably) having an NCO content of at least 25% by weight.

Mixtures of MDI with up to 25% by weight of other polyisocyanates mentioned above may be used if desired.

The polyisocyanate may contain dispersed urea particles and/or urethane particles prepared in a conventional way, e.g. by adding a minor amount of an isophorone diamine to the polyisocyanate. Most preferred MDI are isomeric mixtures containing less than 5% of 2,2'-MDI, 5-60% of 2,4'-MDI, the remainder being 4,4'-MDI.

Polyether polyols for making ingredient 1a) preferably are selected from products obtained by the polymerisation of propylene oxide in the presence of polyfunctional initiators followed by the polymerisation of ethylene oxide. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane and 1,2,6-hexanetriol. Mixtures of initiators may be used.

Other polyols which may be used comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol.

Polyoxyalkylene polyols containing from 5 to 50% of dispersed polymer are particularly useful. Particle sizes of the dispersed polymer of less than 50 microns are preferred.

During the last years several methods have been described to prepare polyether polyols having a low level of unsaturation. These developments have made it possible to use polyether polyols at the higher end of the molecular weight range since such polyols can now be prepared with an acceptably low level of unsaturation. According to the present invention polyols having a low level of unsaturation may be used as well. In particular such high molecular weight polyols having a low level of unsaturation may be used for preparing flexible foams having a high ball rebound.

Ingredient 1b preferably is a polymeric MDI having an isocyanate-functionality of 2.5-2.9. Such polymeric MDI's have been described widely; see e.g. the ICI Polyurethanes Book by George Woods, 2nd edition, 1990, page 10-12.

Ingredient 2a may be selected from the polyols mentioned before for preparing ingredient 1a.

Ingredient 2b may be selected from polyols containing 2-8 and preferably 2-6 hydroxy groups prepared by oxyalkylating an initiator—which may be selected from ethanolamine, diethanolamine, triethanolamine, ethylene glycol, diethylene glycol, triethylene glycol, propylene glycol, dipropylene glycol, butanediol, glycerol, trimethylolpropane, pentaerythritol, sorbitol, sucrose, toluene diamine, diethyl toluene diamine, cyclohexane diamine, phenylene diamine, diphenylmethane diamine, an alkylated diphenylmethane diamine and ethylene diamine—using ethylene oxide and optionally another alkylene oxide like propylene oxide. Such polyols and their preparation are widely known in the art.

The additives which optionally are used may be selected from, amongst others, chain extenders, cross-linkers, formation of urea and urethane enhancing catalysts like tertiary amines and tin compounds, surfactants, stabilisers, flame retardants, fillers and anti-oxidants.

The process may be used to make slab-stock or moulded flexible foams. Moulding may be conducted with (preferably to at most 50° C.) and without heating the mould. The foams in general have a core density of 25–80, preferably 40–80, kg/m$^3$ (ISO/DIS 845) and may be used as cushioning material in furniture, car-seats and mattresses.

The present invention is illustrated by the following Example.

EXAMPLE

A polyisocyanate composition was made by mixing 80 parts by weight (pbw) of prepolymer 1, 20 pbw of polymeric MDI and 0.7 pbw of SH210.

A polyol composition was made by mixing 2.5 pbw of water, 40 pbw of polyol 1, 10 pbw of a glycerol initiated polyoxyethylene polyol of MW1200, 0.35 pbw of D8154, 0.3 pbw of triethanolamine and 0.3 pbw of DMAPA.

A moulded flexible foam was prepared by allowing the above compositions to react in a mould (Krauss Maffei 2K RIMSTAR 40/20—mould temperature 45° C.). After demoulding a foam was obtained having a core density of 62 kg/m$^3$ (ISO/DIS 845); compression set, 50%—core/dry and humid (100% humidity at 50° C.) of 2% and 3% (ISO 1856); compression hardness, 40% of 4.0 kPa (ISO 3386/1), a resilience of 70% (ISO/DIS 8307) and a hysteresis loss of 12% (ISO 3386/1).

The polyisocyanate composition and the polyol composition were easily processable.

Prepolymer 1: The reaction product of MDI (10% 2,4'-MDI and 90% 4,4'-MDI) and a 6000 MW EO/PO polyol with nominal functionality of 3 and 15% w EO (all tipp). NCO value of prepolymer is 6.8% w.

Polymeric MDI: NCO value 30.7% by weight; isocyanate functionality 2.7.

SH210: silicone surfactant from OSi Specialties.

Polyol 1: 4500 MW EO/PO polyol with nominal functionality of 3 and 15% w EO (all tipp).

D8154: amine catalyst from Air Products.

DMAPA: dimethylaminopropylamine, catalyst.

We claim:

1. A reaction system comprising
   a polyisocyanate composition, having an NCO value of 10–25% by weight and comprising based on 100 parts by weight
   a) 8–60 parts by weight of free diphenylmethane diisocyanate;
   b) 2–20 parts by weight of free polymethylene polyphenylene polyisocyanates having an isocyanate functionality of 3 or more; and
   c) 30–90 parts by weight of an adduct of diphenylmethane diisocyanate and a polyol having an average nominal hydroxyl functionality of 2–3, a number average equivalent weight of 1000–3000 and an oxyethylene content of 5–25% by weight; and a polyol composition in an amount of 30–150 parts by weight per 100 parts by weight of the above polyisocyanate composition, said polyol composition comprising
   a) 70–90 parts by weight of a polyoxyethylene-polyoxypropylene polyol having an average nominal hydroxyl functionality of 2–3, a number average equivalent weight of 1000–3000 and an oxyethylene content of 5–25% by weight;
   b) 5–25 parts by weight of a polyether polyol having an average nominal hydroxyl functionality of 2–8, a number average molecular weight of 200–3000 and an oxyethylene content of at least 80% by weight based on the total oxyalkylene content;
   c) 2–8 parts by weight of water; the amount of 2a), 2 b) and 2 c) together being 100 parts by weight; and optionally
   d) additives.

2. A reaction system comprising a polyisocyanate composition having an NCO value of 10–25% by weight and comprising
   a) 70–90 parts by weight of an isocyanate prepolymer having an NCO value of 5–15% by weight prepared by reacting an excessive amount of an organic polyisocyanate and a polyol having an average nominal hydroxyl functionality of 2–3, a number average equivalent weight of 1000–3000 and an oxyethylene content of 5–25% by weight;
   b) 10–30 parts by weight of a polyisocyanate having an NCO value of 30–33% by weight; and
   a polyol composition in an amount of 30–150 parts by weight per 100 parts by weight of the above polyisocyanate composition, said polyol composition comprising
   a) 70–90 parts by weight of a polyoxyethylene-polyoxypropylene polyol having an average nominal hydroxyl functionality of 2–3, a number average equivalent weight of 1000–3000 and an oxyethylene content of 5–25% by weight;
   b) 5–25 parts by weight of a polyether polyol having an average nominal hydroxyl functionality of 2–8, a number average molecular weight of 200–3000 and an oxyethylene content of at least 80% by weight based on the total oxyalkylene content;
   c) 2–8 parts by weight of water; the amount of 2a), 2 b) and 2 c) together being 100 parts by weight; and optionally
   d) additives.

3. Reaction system according to claim 1 wherein the polyisocyanate used for making the isocyanate prepolymer is selected from 4,4'-diphenylmethane diisocyanate, isomeric mixtures of 4,4'- and 2,4'-diphenylmethane diisocyanate, uretonimine and/or carbodiimide modified diphenylmethane diisocyanate having an NCO content of at least 25% by weight and urethane modified diphenylmethane diisocyanate having an NCO content of at least 25% by weight.

4. Reaction system according to claim 1 wherein polyol 2b has an oxyethylene content of 100% by weight.

5. Reaction system according to claim 1 wherein the amount of polyol 2b is 10–25 parts by weight.

6. Reaction system according to claim 1 wherein the amount of the polyol composition is 30–100 parts by weight.

* * * * *